Oct. 5, 1926.                                                           1,602,291
G. A. THIBAULT
DISHWASHING DEVICE
Filed June 24, 1924          2 Sheets-Sheet 1

G. A. Thibault
INVENTOR

BY Victor J. Evans
ATTORNEY

WITNESS:

Oct. 5, 1926.

G. A. THIBAULT 1,602,291

DISHWASHING DEVICE

Filed June 24, 1924    2 Sheets-Sheet 2

G. A. Thibault
INVENTOR

BY Victor J. Evans
ATTORNEY

WITNESS

Patented Oct. 5, 1926.

1,602,291

UNITED STATES PATENT OFFICE.

GEORGE A. THIBAULT, OF ST. ALBANS, VERMONT.

DISHWASHING DEVICE.

Application filed June 24, 1924. Serial No. 722,131.

This invention relates to kitchen apparatus, particularly dish washers, and has for its object the provision of a novel machine intended for domestic use for the purpose of washing dishes and table silver in a rapid and easy manner and without any necessity for putting the hands in the dish water.

An important and more specific object is the provision of a device of this character including a container and a dish holding basket mounted for partial rotary movement therein whereby the water or suds will be agitated so as to impinge against the articles and consequently remove grease and food particles therefrom and leave the dishes in a clean condition.

An additional object is the provision of a device of this character which will be simple and inexpensive in manufacture, easy to install, positive in action, durable in service and a general improvement in the art.

With the above and other objects and advantages in view, the invention consists in the details of construction and arrangement of parts as hereinafter more fully described and claimed, and illustrated in the accompanying drawings, in which:—

Figure 1:
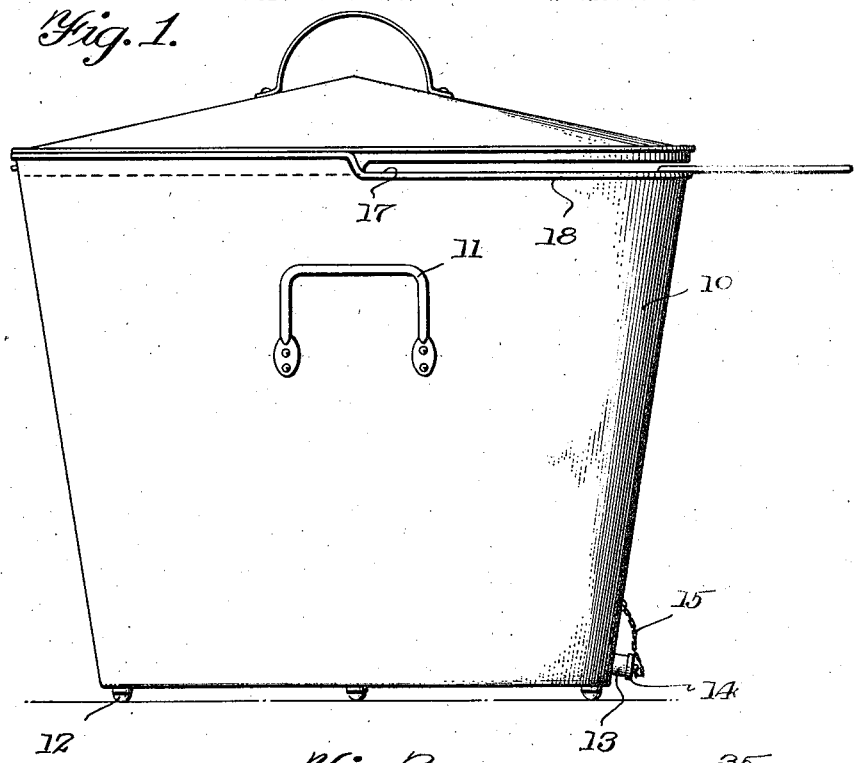
Figure 3:
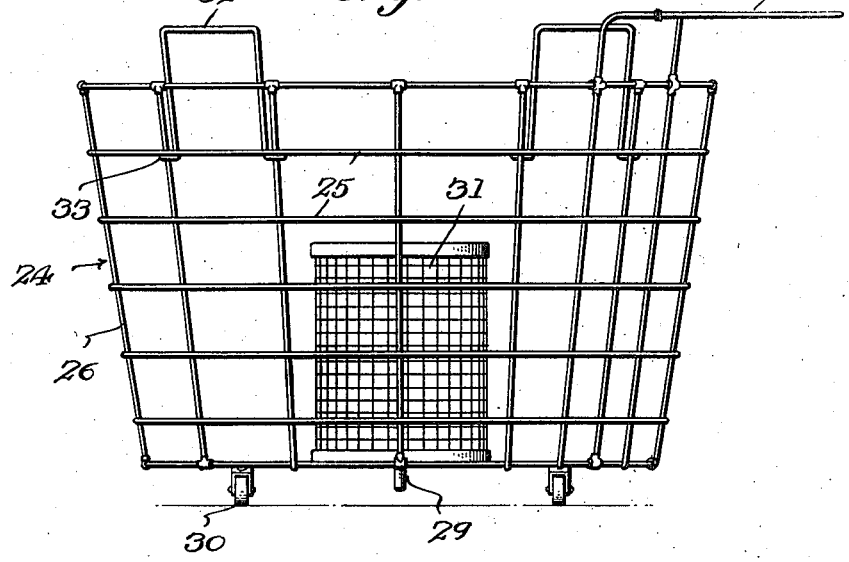
Figure 2:
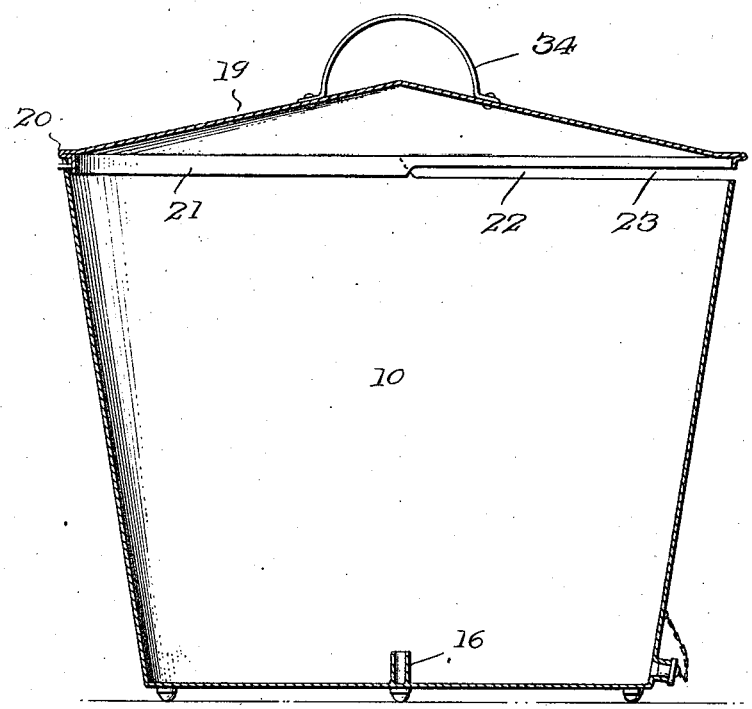
Figure 4:
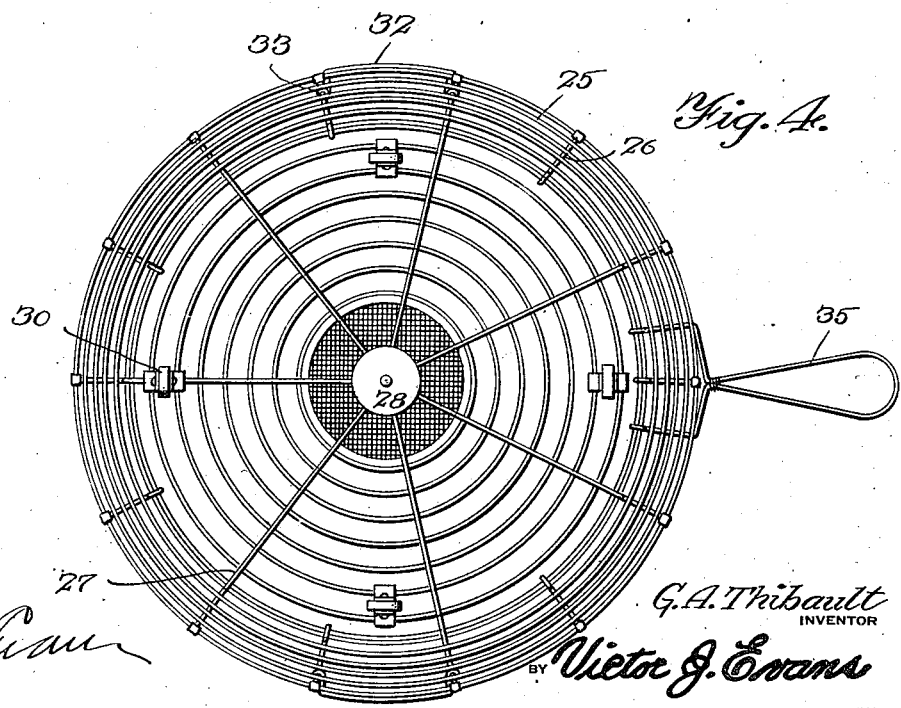

Figure 1 is a side elevation of the device.
Figure 2 is a vertical section through the container.
Figure 3 is a side elevation of the basket.
Figure 4 is a plan view.

Referring more particularly to the drawings, the numeral 10 designates the container or relatively stationary outer member which is of tank like formation and provided with handles 11 and supporting feet 12, preferably rubber. Near its bottom this container is provided with a drain 13 normally closed by a plug, stopper or cap 14 prevented from loss by a chain 15 connected with the container. At its top surface the bottom of the container is provided centrally with a socket 16 for a purpose to be described. At its upper edge the container is cut away at one side as shown at 17 and the entire upper edge is rolled to define a stiffening bead 18.

For closing the top of the container, I provide a cover 19 having a rolled edge 20 seating upon the bead 18, and also having a depending flange 21 telescoped within the container. A portion of this flange is cut away at 22 to define an open space 23 between the cover and the container for a purpose to be described.

For holding the dishes to be washed, I provide a basket designated broadly by the numeral 24 and formed of a plurality of superposed rings or hoops 25 connected by upright wires 26. Connected with the lowermost hoop are radial arms or wires 27 leading from a hub 28 having a central depending projection 29 rotatably engaged within the socket 16. On the bottom of this basket are casters 30 which roll upon the bottom of the container 10.

Secured centrally upon the bottom of the basket 24 is a smaller basket 31 designed to hold silverware to be washed, the dishes being placed within the main basket 24.

For handling the basket 24 I provide a pair of handles 32, each formed as a U-shaped wire member having the ends of its arms outturned and formed with eyes 33 slidably engaged upon certain of the upright wires 26 so that when the basket is in the container the handles 32 may be pushed down if necessary. It should also be stated that the cover 19 is equipped with a handle 34 for the sake of convenience.

Secured to the basket is a handle 35 which projects through the guide opening 23 so that when water or suds is placed within the container and dishes placed in the basket, the latter may be turned back and forth by moving the handle 35. This will cause the water, or suds, to slop about and strike against the dishes and silverware, thus effectively cleaning them. The basket may then be lifted out by means of the handles 32 so that the dishes may drain. By removing the plug 14 the dirty water may be drained out.

It will be observed that I have thus provided a simple and easily operated dish washer which will be rapid in action and which avoids placing the hands in the water.

While I have shown and described the preferred embodiment of the invention, it is to be understood that I reserve the right to make such changes in the form, construction and arrangement of parts as will not depart from the spirit of the invention or the scope of the subjoined claim.

Having thus described my invention, I claim:—

In a dish washer, a dish holding basket formed entirely of wire and having a bottom formed as a series of concentric rings and a plurality of radially extending ribs connected with said rings, upwardly and outwardly inclined wires connected with the outermost one of said concentric rings at points between said radial ribs, a series of vertically spaced rings connecting said upwardly and outwardly inclined wires, certain of said upwardly and outwardly inclined wires being formed to define a laterally extending operating handle, and a pair of U-shaped handle members located at diametrically opposite points of the basket and slidably mounted upon certain adjacent ones of said upwardly and outwardly inclined members whereby to be shifted vertically.

In testimony whereof I affix my signature.

GEORGE A. THIBAULT.